United States Patent
Ochoa et al.

(10) Patent No.: US 10,346,224 B2
(45) Date of Patent: Jul. 9, 2019

(54) MANAGEMENT FRAMEWORK FOR APPLICATIONS USING PASSCODE-BASED ENCRYPTION

(71) Applicant: VMware, Inc., Palo Alto, CA (US)

(72) Inventors: Daniel Ochoa, Austin, TX (US); Karishma Babu, Atlanta, GA (US); Kris Wong, Austin, TX (US)

(73) Assignee: VMware, Inc., Palo Alto, CA (US)

( * ) Notice: Subject to any disclaimer, the term of this patent is extended or adjusted under 35 U.S.C. 154(b) by 31 days.

(21) Appl. No.: 15/691,392

(22) Filed: Aug. 30, 2017

(65) Prior Publication Data

US 2019/0065287 A1 Feb. 28, 2019

(51) Int. Cl.
*G06F 9/54* (2006.01)
*H04L 9/08* (2006.01)

(52) U.S. Cl.
CPC ............ *G06F 9/542* (2013.01); *G06F 9/546* (2013.01); *G06F 2209/548* (2013.01); *H04L 9/0863* (2013.01)

(58) Field of Classification Search
CPC .......... G06F 9/542; G06F 21/41; G06F 21/57; G06F 21/62; G06F 21/78; G06Q 20/341; H04L 9/08; H04L 63/08
USPC .................. 719/318; 713/164, 168, 171, 173
See application file for complete search history.

(56) References Cited

U.S. PATENT DOCUMENTS

| | | | | |
|---|---|---|---|---|
| 7,571,489 B2* | 8/2009 | Ong | ................ | G06F 21/34 726/29 |
| 2013/0054968 A1* | 2/2013 | Gupta | ................ | H04L 63/0428 713/168 |
| 2015/0127940 A1* | 5/2015 | Polehn | ................ | H04L 63/0435 713/168 |
| 2016/0191499 A1* | 6/2016 | Momchilov | ........ | H04L 63/0815 713/171 |

* cited by examiner

*Primary Examiner* — Andy Ho
(74) *Attorney, Agent, or Firm* — Clayton, McKay & Bailey, PC

(57) ABSTRACT

Systems herein allow an email application to manage passcode-based encryption ("PBE") operations on an operating system (OS) that deletes a user passcode from memory. The email application can utilize a lock safe component that implements OS lifecycle classes. The lock safe component can receive an OS event, such as an activity, fragment, service, or SyncManager event. Before causing the email application to handle the OS event, the lock safe component can check whether the user passcode exists in memory. If it does not, the lock safe component can queue services for later operation once the passcode exists. Likewise, the lock safe component can cause the email application to prompt for the user passcode before a user interface ("UI") performs activities or fragments, and pass state information to the email application for performing the activities or fragments.

20 Claims, 9 Drawing Sheets

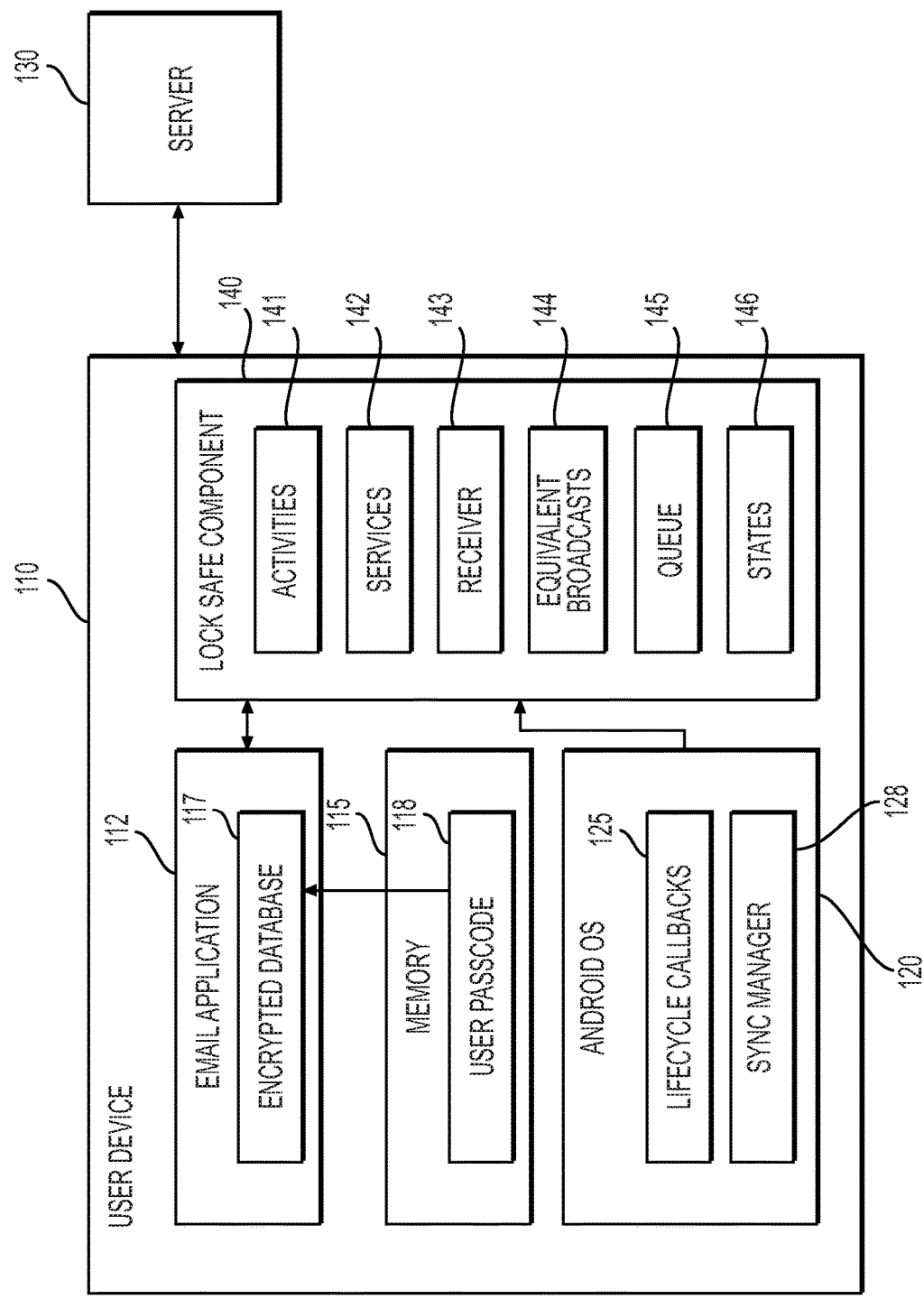

MANAGEMENT FRAMEWORK FOR APPLICATIONS USING PASSCODE-BASED ENCRYPTION

BACKGROUND

Applications can encrypt data locally on a user device, such as a cell phone, laptop, or tablet. Different applications can use different keys that can be unlocked independently with the correct user passcode, or pin. This is particularly useful in the context of an enterprise mobility management ("EMM") system. When enrolled in an EMM system, users can install applications on their own user devices that access and store enterprise data. The locally stored enterprise data can be encrypted with a key that is derived separately from the device login. This provides an extra layer of data encryption that the enterprise can ultimately control. For example, the enterprise can control when the user is able to decrypt the data and can even wipe the data from the user device, such as if the user leaves the enterprise.

Some enterprises require applications to use passcode-based encryption ("PBE") for application-specific encryption. PBE can prompt the user for a passcode (separate from device login) that is used to generate a key for encrypting and decrypting application-specific data. For example, using a key generated with PBE, the application can access a local encrypted database that securely stores the application's data.

However, PBE poses difficulties on some operating systems ("OS"). For example, ANDOID does not allow for persistent storage of the passcode or key in a secure manner. Instead, the ANDROID OS can periodically wipe the user passcode from temporary memory, such as cache, as part of normal maintenance. This causes problems for applications that rely on the passcode to access encrypted data because the passcode is deleted the application can no longer access its data. The ANDROID OS is not designed to accommodate an application that cannot access its own data.

As an example, an email application that stores its data in a local encrypted database needs the user passcode to generate a key to access the encrypted database. Without accessing the data, the application cannot properly operate. When the OS wipes the passcode from cache, it is no longer available. Although the email application can prompt the user to reenter the user passcode, doing so every time the application needs to read or write data negatively affects the user experience. Repeated prompts also do not solve all of the issues. For example, background services utilized by an email application might require data access and can be incapable of prompting the user for the passcode.

Further, the OS can initiate OS events at the email application regardless of whether the user passcode is available. For example, a user interface ("UI") action, such as the email application entering the display foreground, can cause the OS to call a lifecycle method at the email application. This is done even though the email application cannot access its data (because the user passcode is unavailable). Similarly, OS services can be used to perform background services for the email application without regard to the availability of the user passcode. The ANDROID Sync Manager can similarly schedule various operations without accounting for whether the user passcode exists. Since the application cannot access its data without the user passcode, the application will fail to correctly respond to the OS events.

As one example, the email application can depend on triggers from the OS to launch various services so that the email application will retrieve new messages and otherwise update itself. Without access to the user passcode, the update cannot occur. The email application might consider itself updated when it actually is not. It might not alert the user to new messages and can even crash. Because ANDROID does not provide a way to dynamically register and unregister these triggers, the email application can operate erratically. Confusing things even further, the ANDROID OS may attempt to restart services that fail, and those services will continue to fail without the user passcode. This can lead to unpredictable results.

The application can also miss crucial system changes when it cannot access its data. This could include a time or locale change or, in the EMM context, something as crucial as a data wipe command.

To summarize, without guaranteed access to the user passcode, multiple challenges exist for proper email application operation with PBE. Since the passcode is used to protect email application data, losing the passcode means the email application cannot access its own data. As a result, the email application can no longer sync any new data from the server or update any data already stored locally. Additionally, multiple processes and background services are set up to run periodically—regardless of whether the data is locked. In some cases, the email application also depends on triggers from the OS to launch the services updating the email application. When these services run without the user passcode, the email application can crash. The ANDROID OS, by default, tries to help applications recover. Therefore, even if a process is stopped because the passcode is unavailable, the OS can restart it.

To ensure successful operation throughout this scenario, a need exists for a management framework for an email application using PBE.

SUMMARY

An example system can include a user device that executes an email application and a lock safe component. The lock safe component can manage PBE operation and make the email application "lock state aware," allowing it to operate correctly even when the OS removes the user passcode from memory. The lock safe component can include implementations of one or more OS classes, such that methods of the lock safe component are called by the OS when the OS attempts to communicate with the email application.

The email application can encrypt and locally store application data. The data can be encrypted and decrypted using a key that is derived from the user passcode based on an algorithm. In one example, the system stores the user passcode in a local cache for as long as the OS allows. This can allow the email application to avoid re-prompting for the user passcode for as long as possible. Instead, the lock safe component can retrieve and supply the user passcode from cache, and the email application can use the user passcode to access the encrypted data.

Eventually, the OS may erase the user passcode from cache. For example, as part of routine memory cleanup, the cache can be cleared. In this scenario, when the email application receives an OS event, the lock safe component can recognize that the user passcode is no longer present. In response, the lock safe component can delay execution of the OS event. The lock safe component can wait until the user passcode is available again before executing the OS event. Multiple OS events can be stored in a queue for execution in the order they are received.

The OS events can include service initialization requests, activities, fragments, synch events, and OS notifications, such as notifications about changes in date, time, or locale. In one example, activities are defined for the ANDROID OS in an Activity class that includes protected methods corresponding to the activities, such as onAttach( ), onCreate( ), and onCreateView( ). These are also known as OS "lifecycle" methods. The OS can similarly include service and notification broadcast classes with protected methods for implementing the services and broadcasts. The lock safe component can include one or more classes that implement these OS classes. In one example, the lock safe component declares final the protected methods of the OS classes to prevent children of the lock safe component from modifying the lock safe component's operation.

The lock safe component's implementation of the OS methods allows the lock safe component to intercept OS events intended for the email application and check whether the user passcode exists before handling the OS event. For example, when the OS attempts to initiate a process or action at the email application, the OS can call a method that is implemented by the lock safe component. The lock safe component can check memory for the user passcode. If it is unavailable, the lock safe component can delay execution of processes or actions that depend on data stored in the encrypted storage. In one example, the lock safe component can add the OS event to a queue if the OS event is a process, sync message, or notification.

If the OS event is a UI activity, the lock safe component can store state information describing the current state of the UI. Then the lock safe component can redirect the UI of the email application to a passcode entry prompt, and send the state information to the email application. Once the user has entered the user passcode, the email application can restore the UI based on the state information and perform the UI activity. Similarly, when the user passcode is available again, the email application can also execute the OS events in the queue.

It is to be understood that both the foregoing general description and the following detailed description are exemplary and explanatory only and are not restrictive of the examples, as claimed.

BRIEF DESCRIPTION OF THE DRAWINGS

FIG. 1 is an exemplary illustration of system components.

DESCRIPTION OF THE EXAMPLES

Figure 2A:
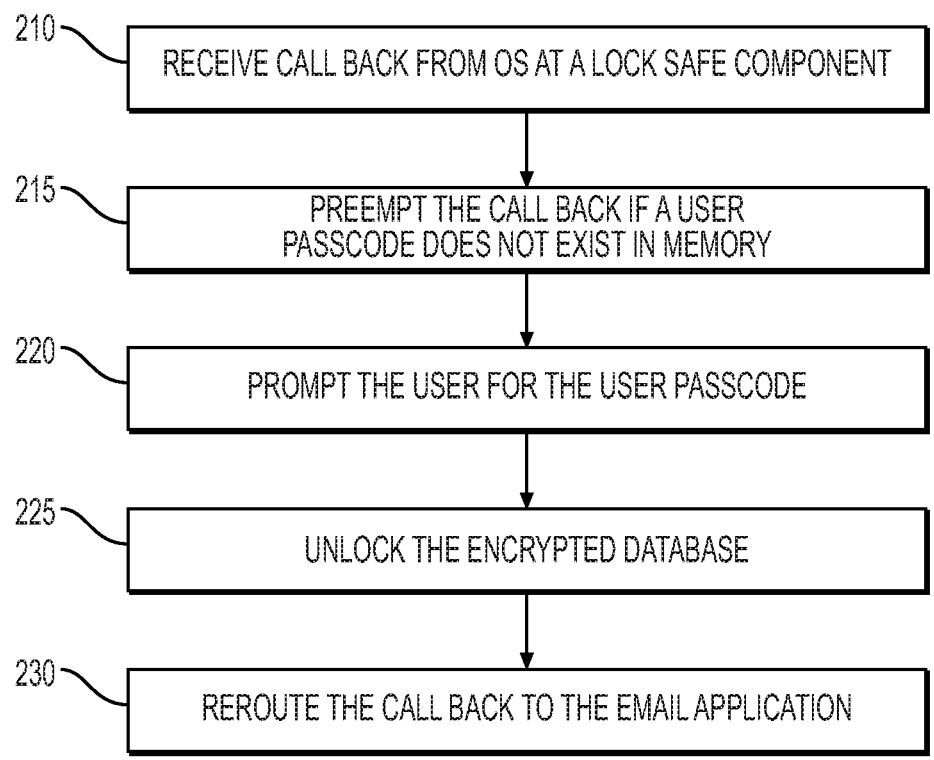
FIG. 2A is an exemplary flow chart of steps performed in a system.

Reference will now be made in detail to the present examples, including examples illustrated in the accompanying drawings. Wherever possible, the same reference numbers will be used throughout the drawings to refer to the same or like parts.

In an example, a user device executes an email application that stores its data in an encrypted database. The user device can also execute an email application that uses PBE. The email application can interact with an OS also executing on the user device. When the user first opens the email application, the user or some other component on the user device can supply the user passcode. Based on the user passcode, the OS or email application can generate a key for accessing the encrypted database. The email application can securely store the user passcode for future use in a cache. However, the OS can wipe the stored user passcode from cache as part of memory maintenance.

To avoid needing to prompt the user for the user passcode each time the email application needs to access data, the email application can execute a lock safe component. The lock safe component can implement OS classes related to reporting OS events to the email application. These OS events can include UI activities, processes, sync commands, and broadcast notifications. By implementing the corresponding OS classes, the lock safe component can intercept the OS messages intended for the email application. This is because the OS communicates with the email application by calling methods from the implemented classes.

When an implemented method is called, the lock safe component can check to ensure that the user passcode is available in memory. If it is, the lock safe component can supply the user passcode to the email application for use in carrying out the OS event. If it is not, the lock safe component can prevent the email application from acting on the OS event until the user passcode is available. This can include storing the OS event and subsequent OS events in a queue. It can also include storing UI state information and redirecting the UI to prompt for the user passcode. When the user passcode is reentered, the lock safe component can supply the state information to the email application for restoring the UI to its prior state. It can also cause the email application to execute the queued OS events in the order received. The lock safe component can also store the user passcode in memory for future retrieval to minimize prompts to the user.

FIG. 1 is an example illustration of a system providing a framework for managing an email application 112 that uses PBE. In this example, a user device 110 executes the email application 112. The user device 110 can be any computing device, such as a smartphone, laptop, tablet, personal computer, or workstation. The user device 110 can include a non-transitory, computer-readable medium containing instructions that are executed by a processor. Example non-transitory, computer-readable mediums include RAM and ROM, disks, and other memory and storage that is accessible by a USB port, a floppy drive, CD-ROM or DVD-ROM drive, and a flash drive, among others.

The email application 112, such as VMWARE's BOXER, can utilize an encrypted database 117 that persists locally on the user device 110. The email application 112 can be managed as part of an EMM system in one example. Alternatively, it can be unmanaged. The email application 112 can send and receive email by communicating with a server 130 in an example.

The encrypted database 117 can be any structure useable for PBE and compatible with the OS 120. To access the encrypted database 117, the email application 112 can utilize a key that is generated based on a user passcode 118. In one example, the email application 112 prompts the user for the user passcode 118 when the application starts. This can allow the email application to temporarily access the data stored in the encrypted database 117.

The user device 110 can also execute an OS 120, such as ANDROID. Although ANDROID is referenced for various examples, other operating systems can also benefit from the system and framework described. The OS 120 can communicate OS events to the email application 112. An OS event, as used herein, can include lifecycle callbacks 125, sync manager 128 messages, and other notifications from the OS 120 to the email application 112.

In ANDROID, lifecycle callbacks 125 are calls from the OS 120 to the email application 112 based on the email application 112 transitioning through different states. The callbacks 125 can be method calls based on methods in the Activity class, Fragment class, or other ANDROID UI components.

In one example, a UI layer of the email application 112 can transition through several states that result in callbacks 125 from the OS 120. The UI layer can be used to display emails, calendar events, contacts and files to the user. It can be constructed when the OS 120 calls implementations of the Activity and Fragment classes. Activities and fragments are Android OS 120 components. An activity creates a window on the display of the user device 110 where the email application 112 can place its UI. A fragment is a piece of the UI that can be placed in an activity. An activity and a fragment are started by the Android OS 120 when the user launches the email application 112 or navigates to a different screen within the email application 112. Every fragment or activity transitions through different states in their lifecycle as the user navigates through the email application 112. State changes can result in callbacks 125 from the OS 120.

One example lifecycle callback 125 is the onCreate( ) method. onCreate( ) is called when an activity is initialized. This method is responsible for setting the layout and resources needed by the UI.

Lifecycle callbacks 125 often require the email application 112 to access its data. This requires the email application 112 to have access to the user passcode 118 for purposes of decrypting the database 117. For example, the OS 120 can create and destroy activities and fragments based on the behavior of the user. These activities and fragments might need to access data that is stored in the encrypted database 117. Since the ANDROID OS 120 requires the email application 112 to transition through all the mandatory lifecycles, this can lead to failed database 117 access, which can cause a crash. There is no existing mechanism available in ANDROID to preempt these mandatory states and re-route the user to an alternate activity or fragment instead.

The email application 112 can use ANDROID's Content Providers framework for storing and accessing the data of the encrypted database 117. Content Providers can encapsulate the data that is stored in the encrypted database 117. The database 117 can be encrypted with a user passcode 118 that is not stored long term on the user device 110. As a result, the email application 112 needs the user to enter their passcode to access the database 117. Under this ANDROID framework, the email application 112 cannot read from or write into the database 117 without the user passcode 118. The Android OS 120 can start and kill the email application 112 based on user behavior and without any regard for whether the user passcode 118 is available. As a result, modules that access the database 117 might be started by the OS 120 when the data is locked.

To assist with the management of the user passcode 118, a lock safe component 140 can be executed in conjunction with the email application 112. For example, an email application 112 coded to presume that data is accessible can be paired with the lock safe component 140 to ensure proper operation in a scenario where data can be locked. In another example, the lock safe component 140 can be part of the email application 112. Alternatively, it can be a separate process that communicates with the email application 112.

The lock safe component 140 can make the email application 112 aware of whether its data is locked. The lock safe component 140 can also notify any components interested in locked state changes through listeners. Listeners can be used to defer initialization and usage until the application is unlocked. This can allow the email application 112 to continue receiving OS events (e.g., notifications) while offline and process them once the user passcode 118 is entered. Services that ensure emails are received can execute on unlock. Similarly, locale and time changes can process so that calendar notifications can occur on time.

The lock safe component 140 can implement one or more classes used by the OS 120 for communicating with the email application 112. By implementing these classes, the lock safe component 140 can preempt calls to the email application 112 and make decisions on how to handle an OS event based on whether the user passcode 118 is available (and, consequently, whether the data is locked). When the OS 120 calls a method extended by the class implementation, the lock safe component 140 effectively intercepts a communication from the OS 120 to the email application 112. As will be described further, if the user passcode 118 is available, the lock safe component 140 can instruct the email application 112 to execute the OS event. Alternatively, if the user passcode 118 is not available, the lock safe component 140 can block the OS event from executing at the email application 112 until the user passcode 118 exists.

In one example, the lock safe component 140 implements the OS classes and declares the protected methods of those classes as final. This can help prevent any child class from changing the user passcode 118 management features of the lock safe component 140.

In one example, after the user inputs the passcode 118, the lock safe component 140 can cache it in memory 115. As long as the user passcode 118 persists, the lock safe component 140 can retrieve it when it is needed by the email application 112 to access data. This avoids many prompts to the user. For example, without this caching mechanism, the user would be prompted for their passcode each time the email application 112 was killed by the user or the OS 120. With the caching mechanism, the email application 112 predominantly prompts for the passcode 118 on user device 110 reboot.

Even though the user passcode 118 can be stored for a time in memory 115, in some cases the OS 120 eventually removes the user passcode 118. For example, most operating systems 120 employ maintenance tasks to optimize memory performance. This can include periodically cleaning up or deleting cached memory 115. When this occurs, the email application 112 will again be without access to the user passcode 118. This also means it can no longer access its data in the encrypted database 117.

In one example, the lock safe component 140 can preempt lifecycle callbacks 125 related to the UI by implementing the Activity and Fragment classes of the OS 120. When the OS 120 attempts a lifecycle callback 125, it can call one of the implemented methods at the lock safe component 140. Rather than simply passing the OS event to the email application 112, the lock safe component 140 can execute its own activities 141.

For UI activities 141, the lock safe component 140 can store state information 146 of the UI. The state information 146 can describe the current screen or screen contents in a manner that allows the email application 112 to recreate the UI screen. Then the lock safe component 140 can redirect the email application 112 to a prompt screen for the purposes of having the user re-enter the user passcode 118. The lock safe component 140 can pass the state information 146 to the email application 112, allowing the email application 112 to restore the UI screen to the stored state 146 once the user passcode 118 is available. In this way, the lock safe component 140 can prevent UI operation until the user passcode 118 has been re-entered.

Lock safe component 140 functionality for handling callbacks 125 for Activities and Fragments is further described with regard to FIGS. 2A and 4A, below.

The lock safe component 140 can similarly preempt service OS events by implementing the Service and Receiver classes of the OS 120. This can allow the lock safe component 140 to execute its own services 142, receivers 143, and broadcasts 144 that take into account the availability of the user passcode 118. A service 142 can be an ANDROID OS 120 component that performs operations in the background of applications, such as the email application 112. The email application 112 can use multiple services 142 to perform different background services. Special flags signify to the OS 120 that it should recreate the service 142 if it stops for any reason. Without access to the user passcode 118, the lock safe component 140 can stop the services 142 from running. However, the OS 140 may attempt to restart the service 142.

A receiver 143 is an ANDROID OS 120 component that can receive notifications from the OS 120 or other applications. These can include notifications indicating that boot is complete or that a time change has occurred. The email application 112 can use broadcast receivers to listen for these notifications and updates itself accordingly. However, if the email application 112 receives a notification when the user passcode 118 is unavailable, it may be unable to update correctly. The ANDROID OS 120 does not provide a mechanism for rescheduling the notifications for a later time.

A similar problem exists for handling OS 120 sync requests. For example, the Sync Manager 128 is an ANDROID OS 120 component that helps schedule and manage sync operations on the user device 110. After the email application 112 registers with the Sync Manager 128, the Sync Manager 128 periodically triggers the email application 112 to perform a sync. In one example, the email application 112 can register with the Sync Manager 128 once a user creates or adds an email account. The email application 112 can use the Sync Manager 128 to sync email from the email servers 130. The email application 112 is unregistered when the account is removed, in an example. However, the ANDROID OS 120 does not provide a way to dynamically register and unregister from the Sync Manager 128. As a result, the OS 120 can trigger the email application 112 to perform a sync even when it cannot access the database 117.

The lock safe component 140 can receive OS events that are services, notifications, or sync requests, at the services 142 or receiver 143 implemented methods. The lock safe component 140 can check whether the user passcode 118 exists before allowing the service, notification, or sync request to execute at the email application 112. If the user passcode 118 does not exist, the lock safe component can add the OS event to a queue 145. The queue 145 can be serialized and stored on in persistent storage of the user device 110. This can ensure that pending OS events (e.g., services, notifications, and sync requests) are not lost on reboot of the user device 110. The services, notifications, and sync requests can be stored in the order they are received. When the user passcode 118 is attained, these OS events can then execute in the order that they are stored in the queue 145.

For notifications, the lock safe component 140 can perform equivalent broadcasts 144. The ANDROID OS 120 does not give permission to applications to send system broadcasts. To handle all pending notifications, the email application 112 can rebroadcast the system intents with corresponding application-level equivalents 144. At the email application 112, these equivalent broadcasts 144 can be transparently converted back to the system broadcast to prevent any change in the email application's 112 legacy broadcast receivers and services.

Lock safe component 140 functionality for handling services and notifications is further discussed below with regard to FIGS. 2B, 4B, and 4C. Functionality for handling sync messages is further discussed with regard to FIGS. 2C and 4C.

FIG. 2A includes example stages performed on a user device 110. These stages can be performed by an email application 112 that includes a lock safe component 140, in an example. The stages can allow the email application 112 to become lock state aware with regard to UI activities and the handling of lifecycle callbacks 125.

At stage 210, the lock safe component 140 can receive a callback 125 from the OS 120. The callback 125 can be a method call at an Activity or Fragment class implemented by the lock safe component 140. As explained above, both of these classes are used by the ANDROID OS 120 to transition through different mandatory states in an application lifecycle, such as while the user navigates through the application 112.

Example lifecycle callback 125 methods include onCreate( ) onRestart( ) onStart( ) onResume( ) onAttach( ) and others. As an example, the OS 120 can call onCreate( ) when the activity is first created, such as when the email application 112 opens. This is where the email application 112 can create views, bind data to lists, and other tasks. If a previous state 146 is stored, the lock safe component 140 can provide the state 146 as part of onCreate( ) This can be followed by onStart( ) which the OS 120 can call when the view is becoming visible to the user. onResume( ) is called when the application 112 comes into the foreground, and onStop( ) is called if the application 112 becomes hidden.

As another example, an activity can be started by the OS 120 with a call to the startActivity(Intent) method of the lock safe component 140. This method can be extended in a class that implements the Intent class of the OS 120. An Intent can describe the activity to be executed. In one example, the Intent is one or more commands issued by the OS 120.

The lock safe component 140 can implement these methods. They can be declared as final so that any other child or sub-class cannot override the user passcode 118 management framework.

At stage 215, the lock safe component 140 can preempt the callback 125. In one example, the lock safe component 140 can prevent the UI from being created if the user passcode 118 is unavailable since the application 112 cannot read any stored data. By handling this preemption at the lock safe component 140, the email application 112 can receive new UI releases without those releases each needing to handle preemption. Instead, it is handled by the lock safe component 140.

In one example, scenarios where the lock safe component's 140 implementation of the Activity and Fragment methods can all a new set of lifecycle methods if the email application 112 has access to the user passcode 118.

If not, the lock safe component's 140 implemented methods can route the user to a new screen that prompts the user for their passcode 118 at stage 220. The implemented Activity or Fragment method can also forward a bundle that contains state information 146. The state information 146 can describe a prior or current screen of the UI. After the user enters their user passcode 118 correctly, the email application 112 can use the state information 146 to take the user to the screen they initially launched.

At stage 225, the email application 112 can unlock the encrypted database 117. This can be done using PBE principles. For example, the user passcode 118 can be utilized by a PBE algorithm to generate a key. The key is then used to unlock the data in the encrypted database 117. At stage 230, the callback 125 or other OS event is routed to the email application 112 for completion. This can include calling another method at the email application 112 from the implemented method of the lock safe component 140. The method at the email application 112 can be an alternate version of a lifecycle method in one example.

The key can be destroyed after the completion of the OS event, such as when the implemented method or alternate version of the lifecycle method finishes executing. However, the passcode can be retained in non-persistent cache for future use as long as the OS 120 allows.

Figure 2B:
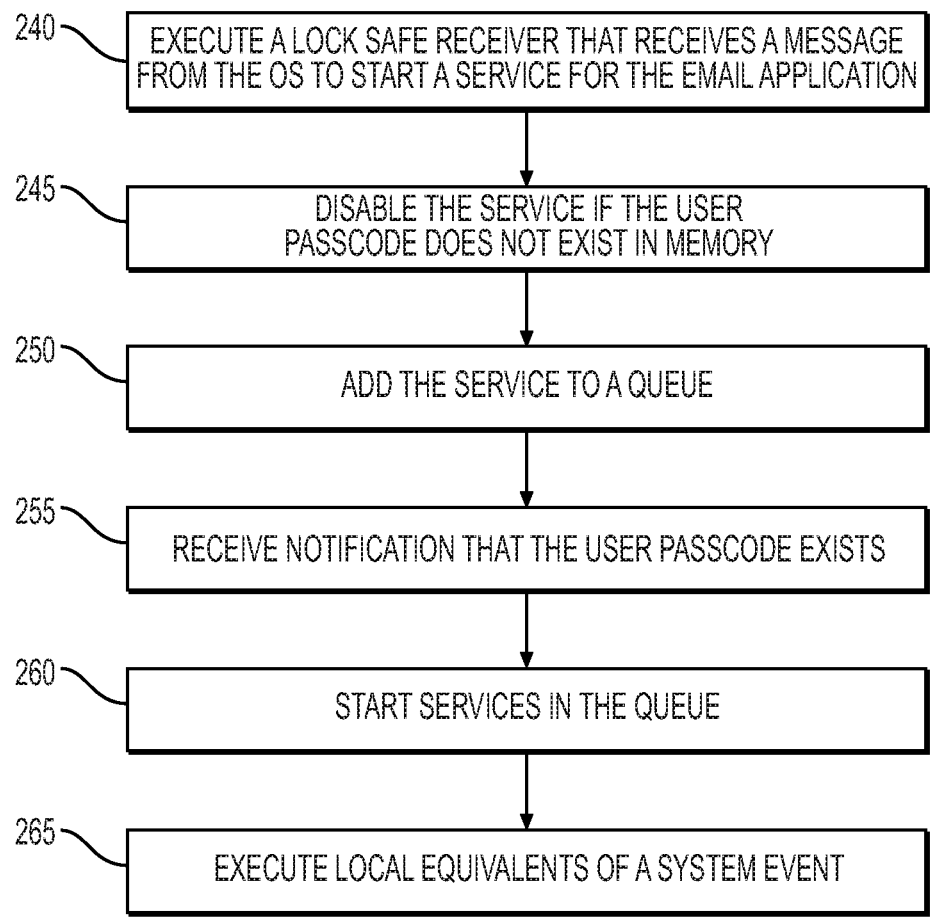
FIG. 2B is an exemplary flow chart of steps performed in a system.

Turning to FIG. 2B, exemplary stages are presented for handling services and broadcasts from the OS 120. In one example, the ANDROID OS 120 can launch the email application 112 through Broadcast Receivers and Services. A broadcast receiver 143 of the lock safe component 140 can receive broadcast messages from the ANDROID OS 120 or other applications on the user device 110. An ANDROID service 142 of the lock safe component 140 is used to perform background operations that can run over a long period of time.

At stage 240, the OS 120 can send a message to a receiver 143 of the lock safe component 140. The receiver 143 can implement a method called by the OS 120. The message can relate to starting a service 142 on behalf of the email application 112. The lock safe component 140 can first check to see if the user passcode 118 is available. If not, then stages 245, 250, and 255 can execute.

At stage 245, the lock safe component 140 can disable the service 142. In one example, this can be done by using ANDROID's PackageManager class to enable and disable services and other components at runtime based on the locked state. However, in some instances the OS 120 can start receivers and services before the lock safe component 140 has a chance to disable them. To solve this problem, the email application 112 can use lock safe component 140 versions of broadcast receivers 143 and services 142. The lock safe component 140 can intercept the OS 120 calls and persist the OS event (e.g., service or notification) in a queue 145. These OS events can later be processed once the application 112 is unlocked.

By serializing and persisting the queue 145 on disk at stage 250, the email application 112 can receive and handle all important OS notifications, such as changes in locale or time. The email application 112 can further receive OS events that are generated based on an EMM system. For example, if an EMM system issues a command to wipe enterprise data from the user device 110, the corresponding OS services can be queued for later execution once the data is unlocked. These OS events can persist for execution even after a device reboot, in an example.

At stage 255, the lock safe component 140 can receive notification that the user passcode 118 exists. This notification can come from a call from the email application 112, a call from the lock safe component 140 to the email application, or a check by the lock safe component 140 of a cached memory location. In response, the lock safe component 140 can serially execute the queued services at stage 260.

OS 120 notifications can require additional handling by the lock safe component 140. For safety reasons, ANDROID OS 120 does not permit applications 112 to send system broadcasts. To compensate for this, the lock safe component 140 can include functionality to rebroadcast equivalents 144 of these OS 120 intents at stage 265. Application-level equivalents 144 of these OS 120 broadcasts can be recognized by the email application 112. The email application 112 can receive these broadcasts and transparently handle them as if they came from the OS 120.

Figure 2C:
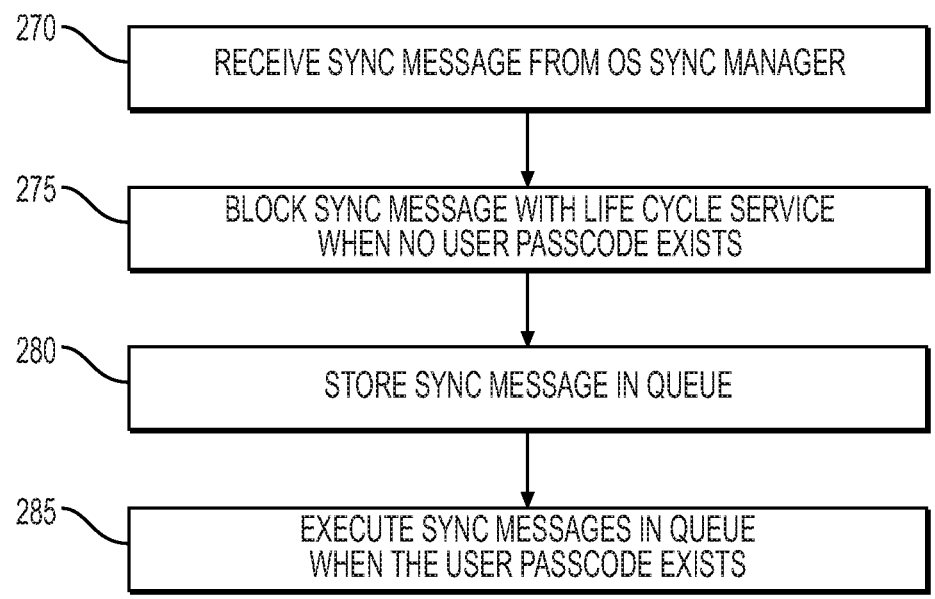
FIG. 2C is an exemplary flow chart of steps performed in a system.

FIG. 2C includes example stages executed in a system to handle sync messages from the OS 120. At stage 270, the lock safe component 140 can receive a sync message from the OS 120 Sync Manager 128. The Sync Manager 128 is an ANDROID OS 120 component that helps schedule and manage sync operations on the user device 110. The Sync Manager 128 can periodically trigger the email application 112 to perform a sync. A sync can include retrieving new emails from the server 130.

This can pose technical problems when the user passcode 118 does not exist. For example, the email application 112 can disable its sync service and attempt to re-enable it once the passcode 118 exists. While this can be a successful approach sometimes, it can also result in a race condition between the OS 120 trigger and the disable operation. If the sync service is not disabled quickly enough, the OS 120 trigger can cause the email application 112 to sync.

As a result, at stage 275 the lock safe component 140 can also include additional checks to confirm that the user passcode 118 exists before proceeding with the sync. If it does not, then the lock safe component 140 can block the sync message. The lock safe component 140 can do so by passing a flag back to the OS 120 to instruct it to not restart the sync manager 128 service.

At stage 280, the sync message can be stored in the queue 145. The lock safe component 140 can use the same queue 145 for storing sync messages, services, and notifications, in an example. At stage 285, when the user passcode 118 again exists, the lock safe component 140 can cause the email application 112 to execute the the sync messages in the queue 145.

Figure 3:
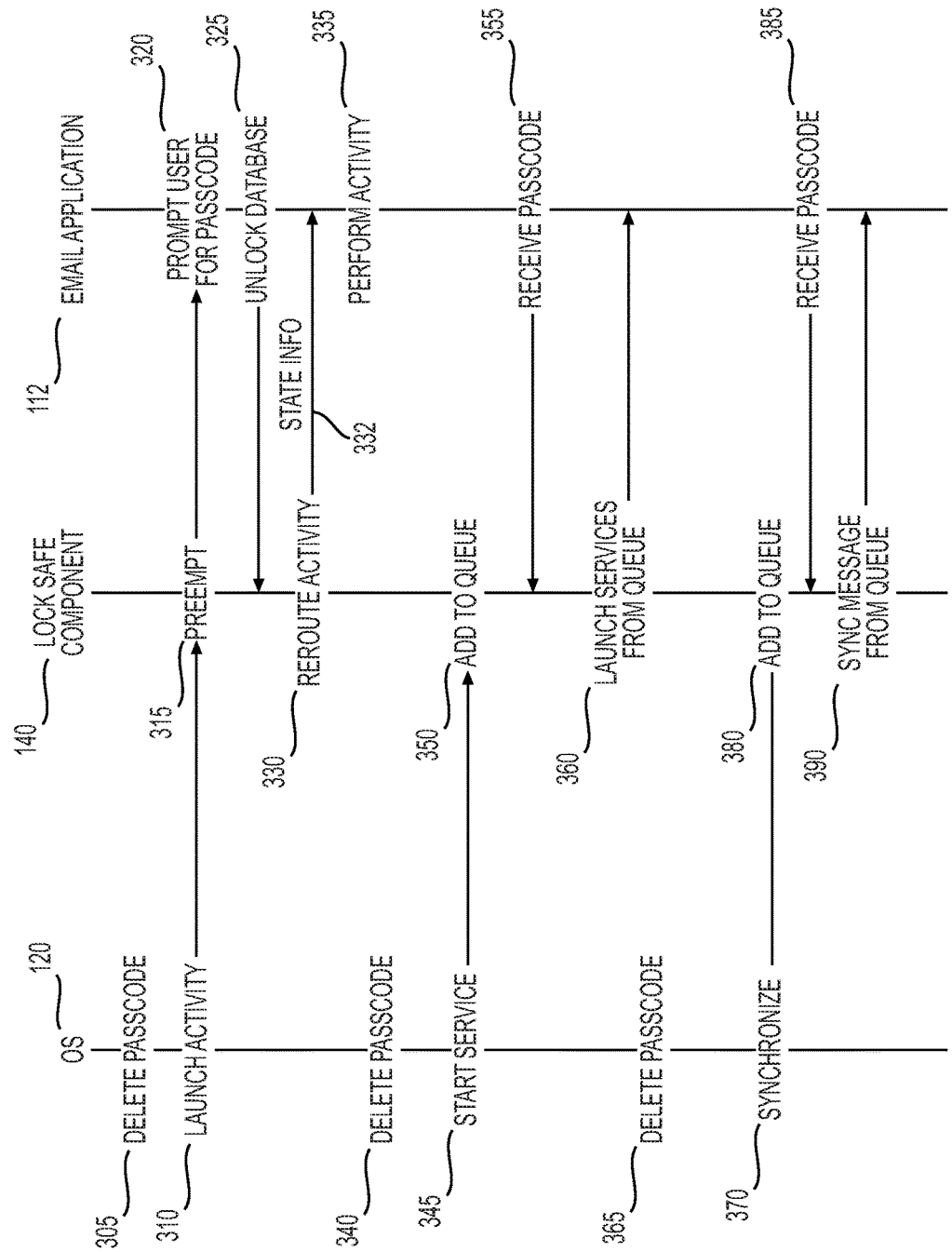
FIG. 3 is an exemplary flow chart of steps performed in a system.

FIG. 3 includes exemplary stages performed between the OS 120, lock safe component 140, and email application 112, in an example. At stage 305, the OS 120 can delete the user passcode 118. Because ANDROID's implementation of PBE does not include a persistent passcode 118, the user passcode 118 can only be cached in temporary memory 115 storage. Eventually, the OS 120 can rewrite, optimize, or erase the temporary memory 115.

At stage 310, the OS 120 can initiate a UI activity. This can occur when the user clicks the UI, brings it to the foreground, relegates it to the background, attaches a file to an email window, or launches the application 112. To initiate the activity, the OS 120 can call a method from the Activity or Fragment class. These classes can be implemented by the lock safe component 140.

The methods of the implemented classes can be declared final and programmed to preempt the activity at stage 315. For example, the lock safe component 140 can determine that the user passcode 118 is unavailable. As a result, it can cause the email application 112 to prompt the user for the user passcode 118 at stage 320. Once the passcode 118 is correctly entered, the email application 112 can unlock the database 117 at stage 325. This can include generating a key based on the user passcode 118 for decryption purposes.

At stage 330, the lock safe component 140 can then reroute the activity of the email application 112. This can include sending state information at stage 332, which the email application 112 can use to restore the UI to a present state. Then the UI can perform the activity at stage 335. In one example, the email application 112 performs the activity based on the lock safe component 140 calling an alternate lifecycle method that is programmed into the email application 112. The lock safe component 140 can also save the user passcode 118 temporarily in a memory 115 cache.

At stage 340, the OS 120 can again delete the user passcode 118 from memory 115. The OS 120 can thereafter attempt to start a service at stage 345 by sending an intent, calling a service method, or broadcasting a notification to a receiver. The lock safe component 140 can intercept the message. Because the user passcode 118 is unavailable, the lock safe component 140 can add the service request, which is one type of OS event, to the queue 145 at stage 350.

At stage 355, the email application 112 can receive the user passcode 118. This can occur, for example, if the user attempts to use the UI such as in stage 310. The lock safe component 140 can be notified that the passcode 118 exists. Then, at stage 360, the lock safe component 140 can call corresponding methods at the email application 112 to perform the services. This can also include calling equivalent broadcast 144 methods when a system broadcast is a queued OS event.

Later, at stage 365, the OS 120 can again delete the user passcode 118. Thereafter, at stage 370, the Sync Manager 128 can attempt to cause the email application 112 to synchronize. This can include sending and receiving emails to and from server 130. The Sync Manger 128 can send a sync message that gets intercepted by the lock safe component 140. At stage 380, the lock safe component 140 can add the sync message to the queue 145. This can be done based on the user passcode 118 being unavailable. Then, after the passcode 118 is received by the email application 112 at stage 385, the lock safe component 140 can call a method in the email application 112 to cause the email application 112 to sync with the server 130 at stage 390. Again, the lock safe component 140 can store the user passcode 118 in memory 115.

Figure 4A:
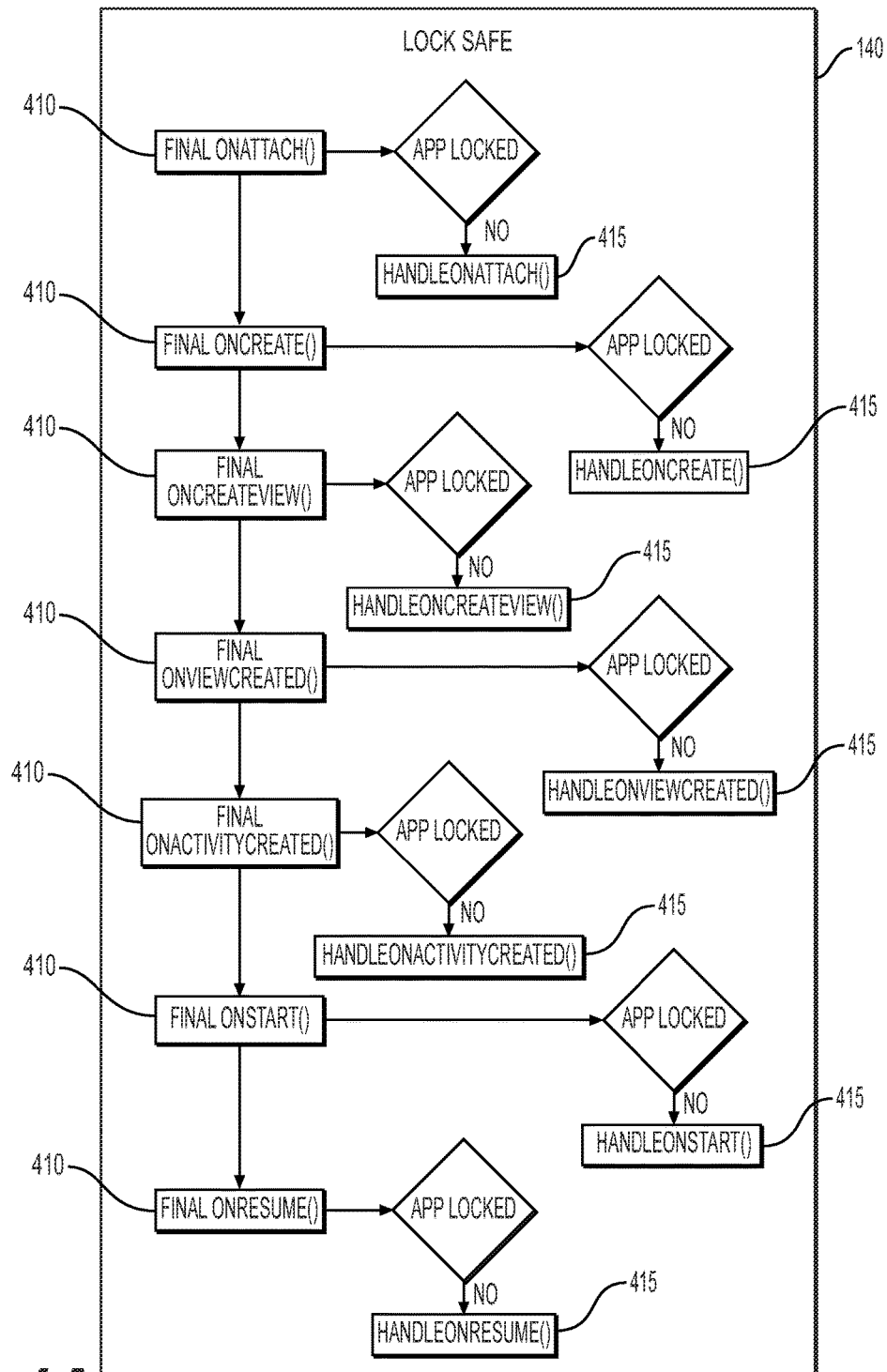
FIG. 4A is an exemplary flow chart of steps performed in a system.

FIG. 4A includes exemplary stages performed by the lock safe component 140 for handling lifecycle callbacks 125 from the OS 120. As illustrated, various lifecycle methods 410 can be implemented by the lock safe component 140. In this example, the implemented methods 410 include onAttach( ), onCreate( ), onCreateView( ), onViewCreated( ), onStart( ), and onResume( ). All of these are lifecycle methods 410 subject to callbacks 125 from the ANDROID OS 120. By implementing these lifecycle methods 410, the lock safe component 140 can intercept callbacks 125 intended for the email application 112.

As illustrated, the lock safe component 140 can declare these lifecycle methods 410 as final. This can prevent another class from extending the methods in a way that changes the user password 118 management framework.

The lifecycle methods 410 can each first check the lock state of the email application 112. They can do this by determining if the user passcode 118 is present. In each case, if the application 112 is not locked, then the lock safe component 140 forwards to a delegate method 415 of the email application 112. A delegate method 415 is an alternate version of a corresponding lifecycle method 410. In one example, the delegate method 415 will behave as if it is the lifecycle method, otherwise unaware that is only being called by the lock safe component 140 after the user passcode 118 is available. In one example, the lifecycle methods 410 can cause the email application 112 to prompt for the user passcode 118 as already described.

Figure 4B:
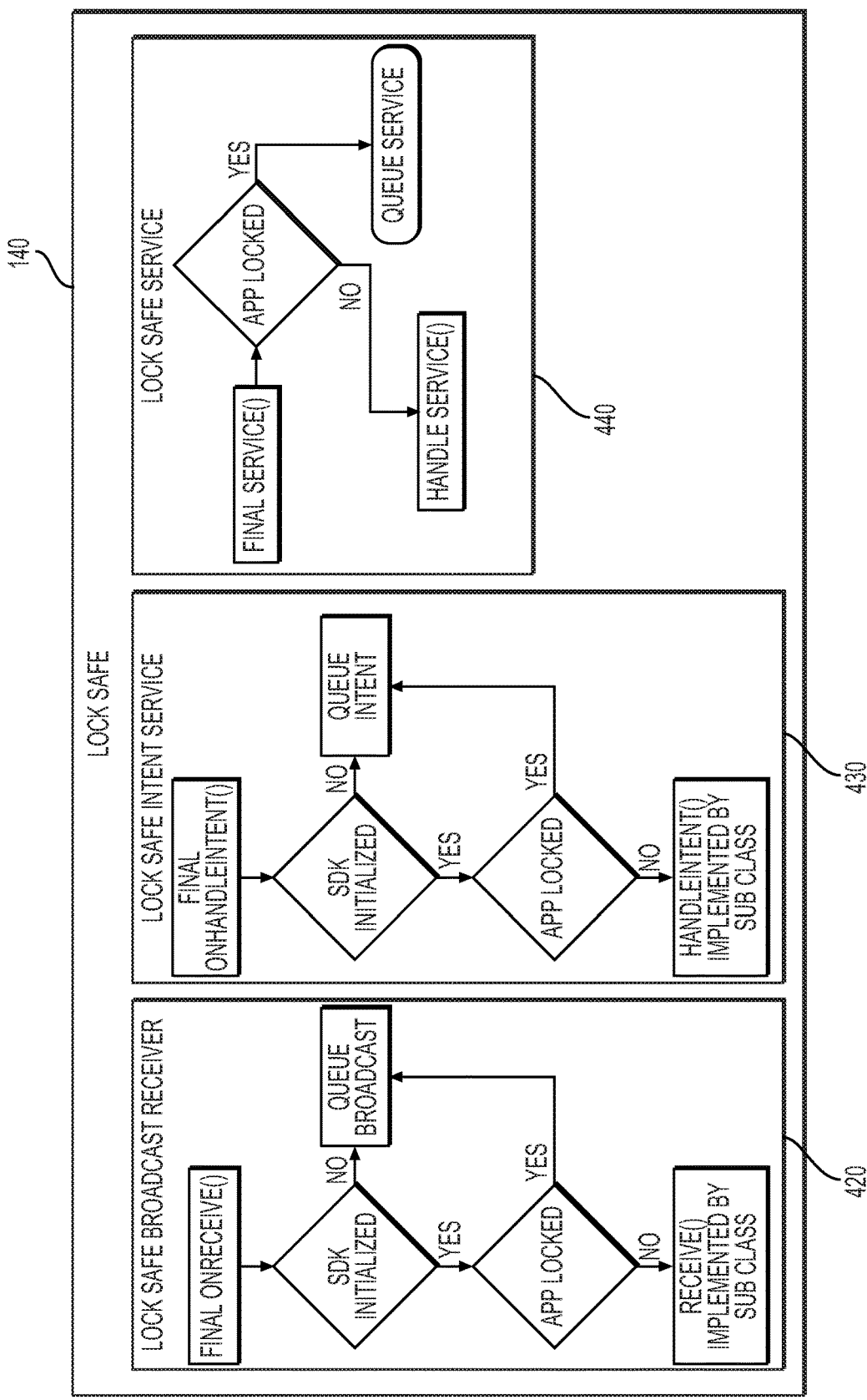
FIG. 4B is an exemplary flow chart of steps performed in a system.

FIG. 4B includes exemplary stages performed by the lock safe component 140 for handling OS 120 notification broadcasts, intents, and services. To handle a broadcast, the lock safe component 140 can implement the Receiver class 420, in an example. The implemented class 420 can extend protected methods, such as onReceive( ). In this example, onReceive( ) is declared as final to prevent manipulation. The OS 120 can broadcast a system notification by calling onReceive( ) The lock safe component 140 can intercept the broadcast and, in this example, perform at least two checks. First, the implemented class 420 can check whether a software development kit ("SDK") is initialized. If it is not, then the email application 112 might not yet be equipped to properly process the notification. The implemented class 420 can also check whether the email application 112 is locked.

If the SDK is uninitialized or the application 112 is locked, then the lock safe component 140 can queue the broadcast for later implementation. The broadcast can be added to a persistent, serialized queue 145 in one example. When the SDK is initialized and the application 112 is no longer locked, then the lock safe component 140 can call an equivalent broadcast 144 method to perform the broadcast. In this example, the equivalent broadcast method is called Receive( ). It can be implemented by a sub class of the lock safe component 140 Receiver class 420, in an example. However, because onRecieve( ) was declared as final, the sub class will not modify that method.

The lock safe component 140 can also implement an Intent class 430, which is another class that is part of the ANDROID OS 120. An intent is an abstract description of an operation to be performed. For ANDROID, It can be used with startActivity to launch an Activity, broadcastIntent to send it to any interested Receiver components, and startService(Intent) or bindService(Intent, ServiceConnection, int) to communicate with a background Service.

In the illustrated example, the implemented Intent class 430 declares onHandleIntent( ) as a final method. When the OS 120 calls onHandleIntent( ) for the email application 112, the lock safe component 140 intercepts the call. The lock safe component 140 can perform similar checks to the Receiver class, such as whether the SDK is initialized and whether the user passcode 118 is available. If either of those conditions is not met, then the lock safe component 140 can queue the intent for later operation when both conditions are satisfied. The lock safe component 140 can then call HandleIntent( ) which is a delegate method implemented by a sub class.

The lock safe component 140 can also implement the Service class 440. Similar to the other implemented classes 420, 430, the implemented Service class 440 can check to see whether the application 112 is locked before causing the email application 112 to handle the service. Until that time, the lock safe component 140 can store the service in the queue 145.

Figure 4C:
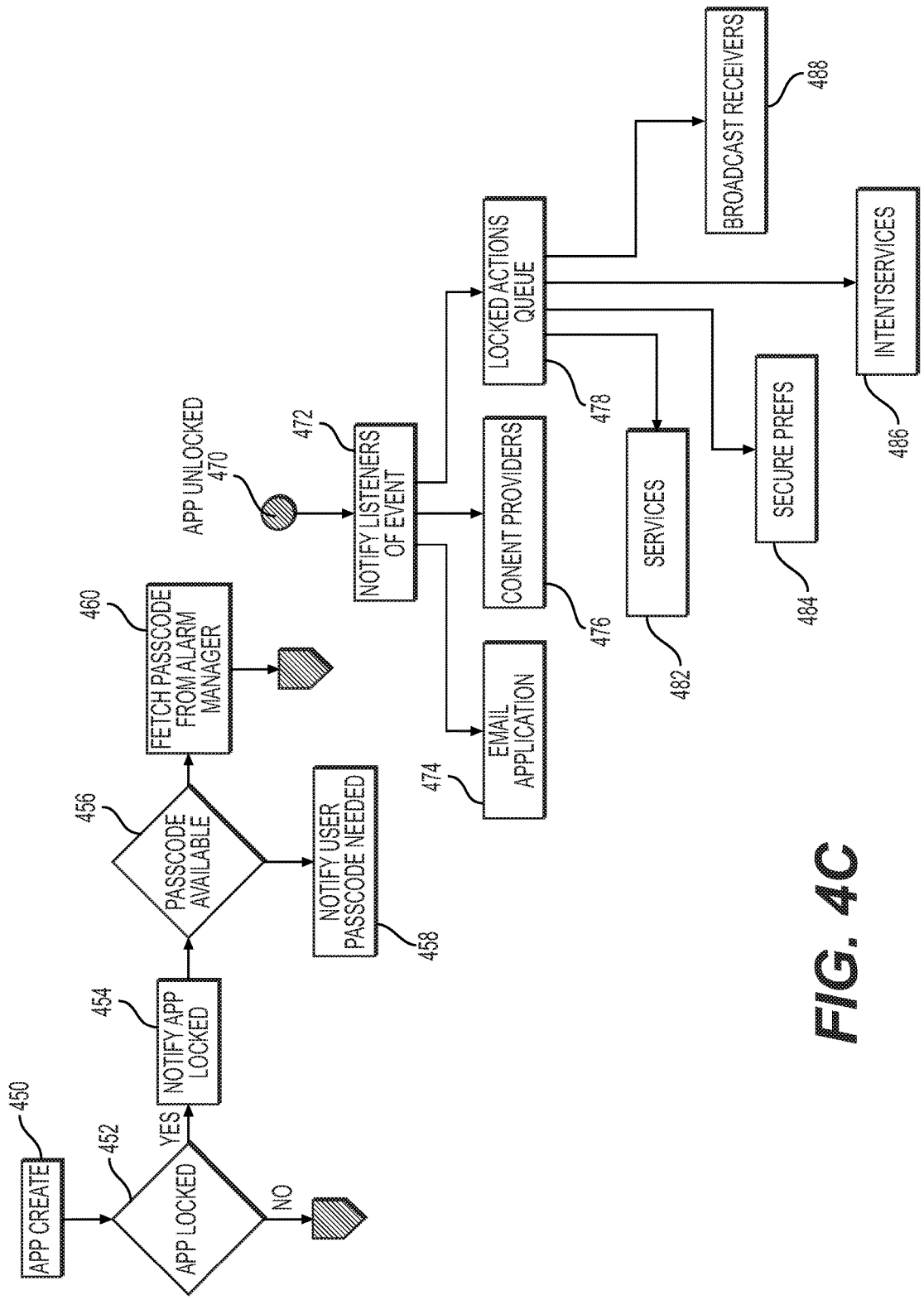
FIG. 4C is an exemplary flow chart of steps performed in a system.

FIG. 4C includes exemplary stages for notifying the various parts of the lock safe component 140 that a user passcode 118 has become available. This can occur, for example, when the user launches the UI. At stage 450, the OS 120 calls an AppCreate( ) method that is implemented by the lock safe component 140. The lock safe component 140 can check whether the application 112 is locked at stage 452. If so, at stage 454 the lock safe component 140 can notify the email application 112 that it is locked. The email application 112 can respond at step 456 by presenting a UI at stage 458 to prompt for the user passcode 118.

Once the passcode 118 is received, the lock safe component 140 can fetch the passcode 118 from an alarm manager at stage 460, in an example. The alarm manager can be implemented from the AlarmManager class in ANDROID, in an example. The alarm manager can schedule services for the email application 112 to run. The alarm manager can also broadcast an Intent to cause the lock safe component 140 to receive notification of the user passcode 118.

At stage 470, the application 112 is unlocked. The application 112 can call an equivalent broadcast 144 method to notify the lock safe component 140. Alternatively, the alarm manager can notify the lock safe component 140. In one example, at stage 472, the alarm manager or other process notifies listeners of the event (e.g., that the user passcode 118 is available). The lock safe component 140 can have one or more listeners active based on the delayed OS events being handled by the lock safe component 140. In this example, the lock safe component 140 can notify the email application 112 of its unlocked state at stage 474. It can also notify content providers that it can accept data at stage 476. It can further begin executing locked OS events in the queue 145 at stage 478. This can include executing queued services at stage 482. It can also include unlocking secure shared preferences at stage 484. It can further include executing intent services at stage 486, and broadcasting at stage 488.

Figure 5:
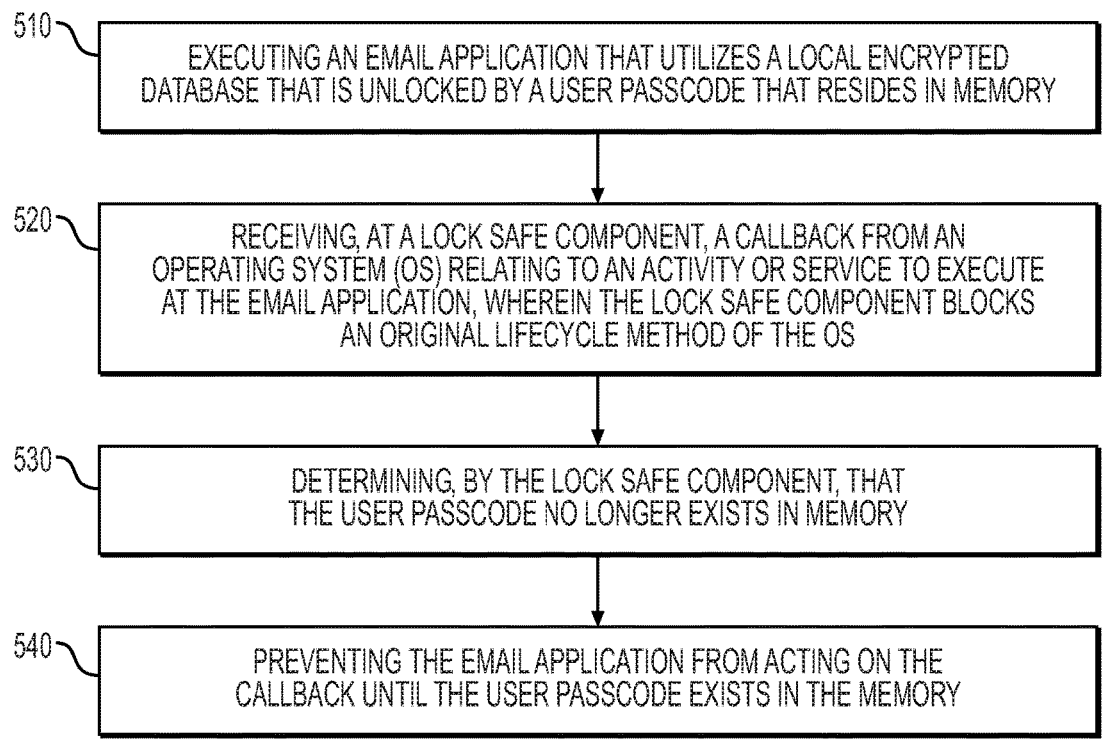
FIG. 5 is an exemplary flow chart of steps performed in a system.

FIG. 5 includes example stages performed by a system. At stage 510, a user device 110 can execute an email application that utilizes the local encrypted database 117. The local encrypted database 117 can utilize PBE, and be unlocked by a key generated based on a user passcode 118. The user passcode can be separate from a user device login, providing an additional layer of protection. The user passcode 118 can be stored non-persistently in memory 115, such as in a temporary cache. The OS 120 can periodically delete information from the memory 115, potentially including the user passcode 118.

At stage 520, a lock safe component 140 can receive an OS event relating to an activity or service to execute at the email application that requires access to the local encrypted database. The OS 120 can call a lifecycle method for the email application 112. However, the lifecycle method can be extended by the lock safe component 140, which can execute as part of the email application 112. In this way, the lock safe component 140 can intercept the OS event before the email application 112 tries to access data in response to the OS event. The OS event can be, for example, a lifecycle callback 125.

At stage 530, the lock safe component 140 can determine that the user passcode no longer exists in memory. The lock safe component 140 can check a set location to try to retrieve the user passcode 118. It can also ask a service, such as the Alarm Manager for the passcode 118, in an example.

At stage 540, the lock safe component 140 can then prevent the email application from accessing data. Instead, the lock safe component 140 can wait until the user passcode 118 exists before causing the email application 112 to execute the OS event. In the meantime, the lock safe component 140 can store services, notifications, and sync messages in a persistent queue. These OS events can be executed in order once the user passcode 118 has been retrieved. For activities, the lock safe component 140 can cause the email application 112 to prompt for the user passcode 118. The lock safe component 140 can forward state information that allows the UI to return to a present state to perform the action. The lock safe component 140 can store the user passcode 118 in a cache to cut down on user prompts for the passcode 118.

Other examples of the disclosure will be apparent to those skilled in the art from consideration of the specification and practice of the examples disclosed herein. The examples are not limited to an enterprise environment, and may be applied on consumer user devices in an example. As used herein, an "OS event" can be any method call made by the OS and is not meant to be limited to only the examples herein.

Though some of the described methods have been presented as a series of steps, it should be appreciated that one or more steps can occur simultaneously, in an overlapping fashion, or in a different order. The order of steps presented is only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A system for managing an email application executing on a mobile device that utilizes passcode-based encryption, comprising:
   a non-transitory, computer-readable medium that contains instructions;
   a memory that stores a local encrypted database; and
   a processor that executes the instructions to perform stages comprising:
      executing an email application that utilizes the local encrypted database that is unlocked by a key generated based on a user passcode, wherein the user passcode is separate from a user device login;
      storing the user passcode in the memory;
      receiving, at a lock safe component, an operating system (OS) event relating to an activity or service to execute at the email application, wherein the lock safe component implements at least one class of the OS and the OS calls a method of the implemented class to send the OS event;
      determining, by the lock safe component, that the user passcode no longer exists in the memory; and
      preventing, by the lock safe component, the email application from accessing the local encrypted database until the user passcode exists in the memory.

2. The system of claim 1, the stages further comprising:
   maintaining a queue of OS events for execution at a later time when the user passcode exists in the memory.

3. The system of claim 2, wherein the lock safe component includes lock safe versions of broadcast receivers and services of the OS, wherein the lock safe versions intercept a callback to the email application and schedules the OS event in the queue.

4. The system of claim 1, wherein the lock safe component implements an activity or fragment class of the OS that checks whether the user passcode is present before calling an alternate version of an OS lifecycle method.

5. The system of claim 4, wherein the lock safe component declares final a protected lifecycle method of the activity or fragment class.

6. The system of claim 1, wherein the lock safe component causes the email application to prompt for the user passcode and forwards state information to the email application, wherein the email application presents a user interface as determined by the state information after the user passcode is received.

7. The system of claim 1, the stages further comprising:
monitoring whether the email application has lost access to the user passcode;
based on detecting access is lost, disabling a synchronization service in the email application that receives sync messages from the OS;
indicating to the OS to not restart the synchronization service;
storing a first sync message in a queue, the first sync message being received by the lock safe component; and
in response to accessing the user passcode, launching the first sync message from the queue and indicating to the OS to restart the service.

8. A method for managing an email application executing on a mobile device that utilizes passcode-based encryption, comprising:
receiving a user passcode for generating a key to decrypt a local encrypted database, wherein the user passcode is separate from a user device login;
storing the user passcode in a memory;
receiving, at a lock safe component, an operating system (OS) event relating to an activity or service to execute at the email application, wherein the lock safe component implements at least one class of the OS and the OS calls a method of the implemented class to send the OS event;
determining, by the lock safe component, that the user passcode no longer exists in the memory; and
preventing, by the lock safe component, the email application from relying on data from the local encrypted database in response to the OS event until the user passcode exists in the memory.

9. The method of claim 8, further comprising:
maintaining a queue of OS events for execution at a later time when the user passcode exists in the memory.

10. The method of claim 9, wherein the lock safe component includes lock safe versions of broadcast receivers and services of the OS, wherein the lock safe versions intercept a callback to the email application and schedule the OS event in the queue.

11. The method of claim 8, wherein the lock safe component implements an activity or fragment class of the OS that checks whether the user passcode is present before calling an alternate version of an OS lifecycle method.

12. The method of claim 11, wherein the lock safe component declares final a protected lifecycle method of the activity or fragment class.

13. The method of claim 8, wherein the lock safe component causes the email application to prompt for the user passcode and forwards state information to the email application, wherein the email application presents a user interface as determined by the state information after the user passcode is received.

14. The method of claim 8, further comprising:
monitoring whether the email application has lost access to the user passcode;
based on detecting access is lost, disabling a synchronization service in the email application receives synch messages from the OS;
indicating to the OS to not restart the synchronization service;
storing a first synch message in a queue, the first synch message being received by the lock safe component; and
in response to accessing the user passcode, launching the first synch message from the queue and indicating to the OS to restart the service.

15. A non-transitory, computer-readable medium containing instructions for managing an email application executing on a mobile device that utilizes passcode-based encryption, the instructions causing a processor to execute stages comprising:
receiving a user passcode for generating a key to decrypt a local encrypted database, wherein the user passcode is separate from a user device login;
storing the user passcode in a memory;
receiving, at a lock safe component, an operating system (OS) event relating to an activity or service to execute at the email application, wherein the lock safe component implements at least one class of the OS and the OS calls a method of the implemented class to send the OS event;
determining, by the lock safe component, that the user passcode no longer exists in the memory; and
preventing, by the lock safe component, the email application from relying on data from the local encrypted database in response to the OS event until the user passcode exists in the memory.

16. The non-transitory, computer-readable medium of claim 15, the stages further comprising:
maintaining a queue of OS events for execution at a later time when the user passcode exists in the memory.

17. The non-transitory, computer-readable medium of claim 16, wherein the lock safe component includes lock safe versions of broadcast receivers and services of the OS, wherein the lock safe versions intercept a callback to the email application and schedule the OS event in the queue.

18. The non-transitory, computer-readable medium of claim 15, wherein the lock safe component implements an activity or fragment class of the OS that checks whether the user passcode is present before calling an alternate version of an OS lifecycle method, wherein the lock safe component declares final a protected lifecycle method of the activity or fragment class.

19. The non-transitory, computer-readable medium of claim 15, wherein the lock safe component causes the email application to prompt for the user passcode and forwards state information to the email application, wherein the email application presents a user interface as determined by the state information after the user passcode is received.

20. The non-transitory, computer-readable medium of claim 15, the stages further comprising:
monitoring whether the email application has lost access to the user passcode;
based on detecting access is lost, disabling a synchronization service in the email application receives synch messages from the OS;
indicating to the OS to not restart the synchronization service;

storing a first synch message in a queue, the first synch message being received by the lock safe component; and in response to accessing the user passcode, launching the first synch message from the queue and indicating to the OS to restart the service.

* * * * *